(12) United States Patent
Horng et al.

(10) Patent No.: US 6,759,819 B2
(45) Date of Patent: Jul. 6, 2004

(54) ROTATION DETECTION CIRCUIT OF A DC BRUSHLESS MOTOR USING A FIXED BIAS VOLTAGE

(75) Inventors: Alex Horng, Kaohsiung (TW); Ying-Ya Lu, Kaohsiung Hsien (TW); Ming-Sheng Wang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/101,709

(22) Filed: Mar. 21, 2002

(65) Prior Publication Data

US 2003/0178956 A1 Sep. 25, 2003

(51) Int. Cl.[7] .................................................. H02P 5/00
(52) U.S. Cl. .................... 318/138; 318/439; 318/720; 318/503
(58) Field of Search ................................ 318/254, 138, 318/439, 139, 720–724, 434, 494, 503, 704, 807; 327/365, 376, 377

(56) References Cited

U.S. PATENT DOCUMENTS

| | | | | |
|---|---|---|---|---|
| 4,656,553 A | * | 4/1987 | Brown | 318/254 |
| 4,806,832 A | * | 2/1989 | Muller | 318/471 |
| 5,872,442 A | * | 2/1999 | Gotou | 318/727 |
| 6,023,139 A | * | 2/2000 | Chin | 318/254 |
| 6,392,372 B1 | * | 5/2002 | Mays, II | 318/138 |

FOREIGN PATENT DOCUMENTS

| | | | | |
|---|---|---|---|---|
| JP | 04312387 A | * | 11/1992 | H02P/6/02 |
| TW | 337386 | * | 5/1997 | |
| TW | 337386 | * | 7/1998 | |

* cited by examiner

*Primary Examiner*—Robert Nappi
*Assistant Examiner*—Eduardo Colon Santana
(74) *Attorney, Agent, or Firm*—Bacon & Thomas, PLLC

(57) ABSTRACT

A rotation detection circuit of a dc brushless motor using a fixed bias voltage includes a transistor, and a signal adjuster. The signal adjuster is connected in series between the transistor and driver circuit of the dc brushless motor, for adjusting a signal output by the driver circuit to the according to a fixed bias voltage. The signal adjuster can be selectively supplied with a fixed bias voltage or connected in series with a zener diode. The signal adjuster can be adjusted according to the characteristics of the motor driver circuit, thereby enhancing the design of the rotation detection circuit.

5 Claims, 3 Drawing Sheets

ROTATION DETECTION CIRCUIT OF A DC BRUSHLESS MOTOR USING A FIXED BIAS VOLTAGE

BACKGROUND OF THE INVENTION

1. Field of the Invention

The present invention relates to a rotation detection circuit of a dc brushless motor using a fixed bias voltage, and more particularly to a rotation detection circuit that may be selectively applied in either a fixed bias voltage manner or connected with a zener diode to thereby ensure that a transistor is completely cut off by a low level input from the driver circuit, and that the transistor is absolutely controlled at a saturation state or a cutoff state by the high or low level.

2. Description of the Related Art

FIG. 1 is a circuit diagram of a driver circuit and a rotation detection circuit (phantom lines) of a dc brushless motor in accordance with the prior art. FIG. 2 is a schematic view of an output waveform outputted by a driver of the drive circuit of a dc brushless motor in accordance with the prior art. As shown in FIG. 1, the conventional motor drive circuit 1 includes a driver ICI, and two coils L1 and L2. A hall bolt module and a control module (transistor) are built in the driver IC 1. A hall member is used to detect changing of a magnetic field of a permanent magnet of a rotor, and a weak hall voltage is amplified, and then two terminals OUT 1 and OUT2 of the driver ICI continuously output a current alternating to the two coils L1 and L2. The two coils L1 and L2 are excited to rotate the rotor. As shown in FIG. 2, the two output terminals OUT 1 and OUT2 of the driver ICI simultaneously output two opposite phases of a square waveform. Referring back to FIG. 1, the conventional rotation detection circuit 10 of a dc brushless motor includes a transistor Q1, and a resistor R1 performed as an amplifier circuit.

Another conventional rotation detection circuit of a dc brushless motor is disclosed in Taiwanese Patent Publication No. 337386, which discloses a sensor line connected to a transistor that performs as a rotation detector. The conventional rotation detection circuit of a dc brushless motor disclosed in Taiwanese Patent Publication No. 337386 is the same as the conventional drive circuit and rotation detection circuit as shown in FIG. 1. However, the conventional rotation detection circuit is only available for a low current driven motor and unavailable for a high current driven motor. If the conventional rotation detection circuit is applied in a high current driven motor, the conventional rotation detection circuit will output an incorrect signal 11 waveform.

FIG. 3 is a schematic view of the waveform of the detection signal outputted by the conventional rotation detection circuit of a dc brushless motor as shown in FIG. 1, wherein the conventional rotation detection circuit is applied in a high current driven motor. When high current drives the motor, the voltage VCE between an emitter and a collector of a transistor of the drive 17 circuit is increased by the current passing through this emitter and this collector. According to different functions of the driver IC, the voltage VCE is about 0.2 to 0.5V while being driven by low current, and is about 0.5 to 1.5V while being driven by high current. Thus, the voltage VCE (0.5 to 1.5V) being driven by the high current is greater than a cutoff voltage 0.7V of the transistor Q1. When the motor drive circuit outputs a low level signal from the voltage VCE (0.5 to 1.5V) to the conventional rotation detection circuit, the output low level signal maybe greater than 0.7V thereby producing a vague low level. Thus, the transistor Q1 of the conventional rotation detection circuit will be conducted at a low level signal, such that the conventional rotation detection circuit will output an incorrect signal waveform due to the transistor Q1 being incompletely cutoff. As shown in FIG. 3, the conventional rotation detection circuit outputs an incorrect signal waveform as shown in phantom lines. Accordingly, the conventional rotation detection circuit outputs an incorrect signal waveform as shown in phantom line instead of a correct signal waveform as shown in solid line, such that it reduces the quality of rotation detection waveform. For solving the above-mentioned problem, it is necessary to eliminate a motor driver circuit outputting a vague low level to conduct the transistor QI of the conventional rotation detection circuit.

SUMMARY OF THE INVENTION

Accordingly, the present invention may improve the abovementioned drawbacks, wherein the rotation detection circuit may be selectively supplied with either a fixed bias voltage or connected with a zener diode to thereby ensure that a transistor is completely cut off by a low level input from the driver circuit, such that the transistor is absolutely controlled in saturation state or cutoff state by high or low level.

An objective of the present invention is to provide a rotation detection circuit of a dc brushless motor in which the rotation detection signal is adjusted based on a fixed bias voltage to thereby ensure that a transistor is completely cut off by a low level input from the driver circuit, so that the quality of the rotation detection signal is enhanced.

Another objective of the present invention is to provide a rotation detection circuit of a dc brushless motor that is connected with a zener diode to thereby ensure that a transistor is completely cut off by a low level input from the driver circuit, so that the quality of the rotation detection signal is enhanced. In accordance with the present invention, a rotation detection circuit of a dc brushless motor using a fixed bias voltage includes a transistor, and a signal adjuster. The signal adjuster is connected in series between the transistor and a driver circuit of the dc brushless motor, for adjusting a signal output of the driver circuit that is supplied from the driver circuit to the transistor in accordance with a fixed bias voltage. The signal adjuster can be selectively supplied with a fixed bias voltage or connected in series with a zener diode. The signal adjuster can be adjusted according to the characteristics of the motor driver IC, thereby enhancing the design of the rotation detection circuit.

Further benefits and advantages of the present invention will become apparent after a careful reading of the detailed description with appropriate reference to the accompanying drawings.

DETAILED DESCRIPTION OF THE PREFERRED EMBODIMENTS

The rotation detection circuit of a dc brushless motor using a fixed bias voltage in accordance with the present invention includes a transistor, and a signal adjuster. The signal adjuster is connected in series between the transistor and a driver circuit of the dc brushless motor, for adjusting a signal output according to a fixed bias voltage from the driver circuit to the transistor. The signal adjuster can be selectively supplied with a fixed bias voltage or connected in series with a zener diode. The rotation detection circuit of a dc brushless motor using a fixed bias voltage may be applied in the driver circuit of a double phase dc brushless motor as shown in the first, second, and third embodiments of the present invention. At the same time, the rotation detection circuit of a dc brushless motor using a fixed bias voltage may also be applied in the driver circuit of a singular phase dc brushless motor as shown in the fourth embodiment of the present invention.

Figure 1:
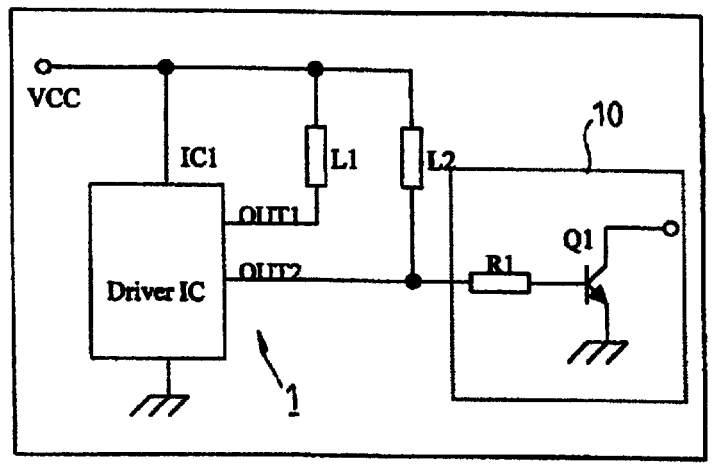
FIG. 1 is a circuit diagram of a conventional driver circuit and a conventional rotation detection circuit of a dc brushless motor in accordance with the prior art.
Figure 2:
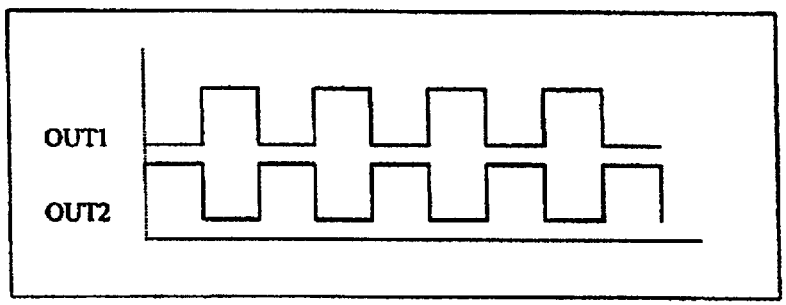
FIG. 2 is a schematic view of an output waveform of a driver member of the conventional driver circuit of a dc brushless motor in accordance with the prior art.
Figure 3:
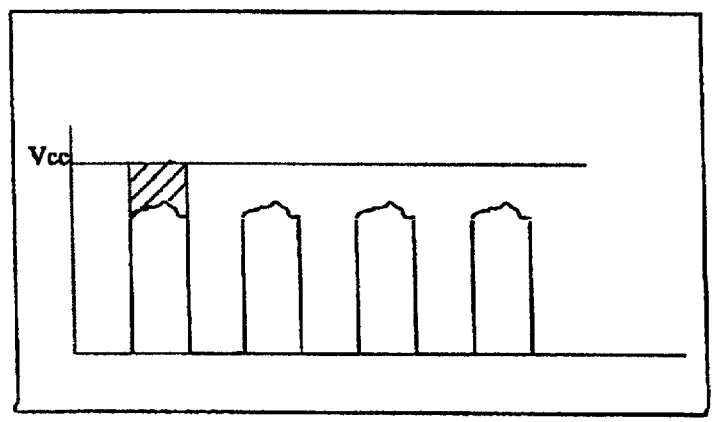
FIG. 3 is a schematic view of the waveform of the detection signal of the conventional rotation detective circuit of a dc brushless motor in accordance with the prior art as shown in FIG. 2, wherein the conventional rotation detection circuit is applied in a high current driven motor.
Figure 4:
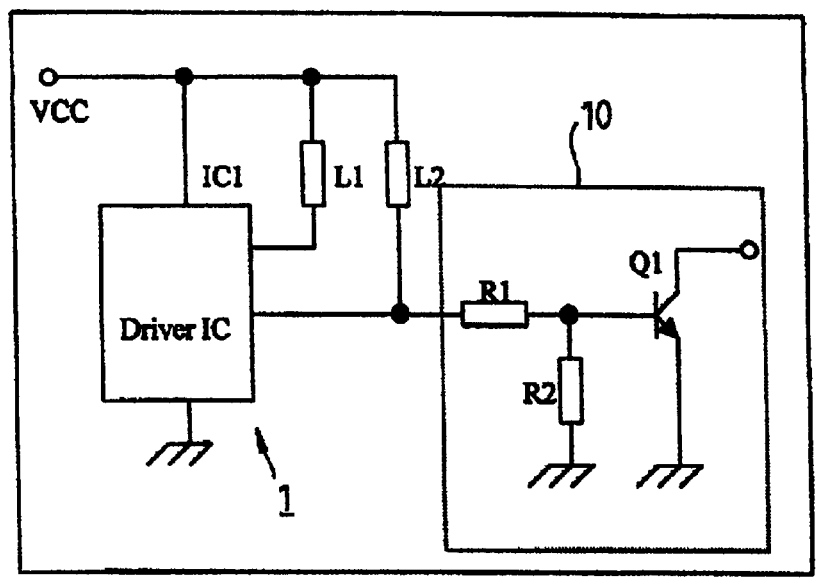
FIG. 4 is a circuit diagram of a rotation detection circuit of a dc brushless motor using a fixed bias voltage and a driver circuit of a double phase dc brushless motor in accordance with a first embodiment of the present invention.

FIG. 4 is a circuit diagram of a rotation detection circuit of a dc brushless motor using a fixed bias voltage and a drive circuit of a double phase brushless motor in accordance with a first embodiment of the present invention.

Referring to FIG. 4, a rotation detection circuit 10 of a dc brushless motor using a fixed bias voltage in accordance with a first embodiment of the present invention comprises a transistor Q1, and a signal adjuster. The signal adjuster is connected in series between the transistor Q1 and a driver circuit 1, for adjusting the driver circuit signal output according to a fixed bias voltage, the driver circuit signal output being supplied from the driver circuit 1 to the transistor Q1, and for outputting the rotation detection signal. The signal adjuster is applied in a fixed bias voltage manner, and therefore comprises a first resistor R1 and a second resistor R2. The first resistor R1, the second resistor R2 and the transistor Q1 form an amplifier circuit in which a base of the transistor Q1 is actuated by the fixed bias voltage input by the first resistor R1 and the second resistor R2. The voltage of the square wave signal output from the driver IC of the driver circuit 1 is initially divided by the first resistor R1 and the second resistor R2, and then input to the base of the transistor Q1 with an amplified signal so as to control the transistor Q1 completely in saturation state or cutoff state by the high or low level. Accordingly, the transistor Q1 can be avoided operating in vague state between the saturation state and the cutoff state. The ratio of the first resistor RI and the second resistor R2 may be adjusted adjusted according to the characteristics of the motor driver IC, thereby improving the design of the rotation detection circuit 10.

Again referring to FIG. 4, the driver IC of the motor driver circuit 1 outputs a low level signal to the rotation detection circuit 10, which signal may be a low level vague signal greater than 0.7V The voltage of the low level vague signal is initially divided by the first resistor R1 and the second resistor R2, and then is input into the base of the transistor Q1. At this time, the low level signal is absolutely reduced to smaller than 0.7V so that the transistor Q1 of the rotation detection circuit 10 cannot be conducted at the low level signal. When the driver IC of the motor drive circuit 1 outputs a high level signal to the rotation detection circuit 10, the voltage of the high level signal is divided by the first resistor R1 and the second resistor R2. At this time, the high level signal is maintained greater than 0.7V, so the transistor Q1 of the rotation detection circuit 10 can be conducted at the high level signal. The transistor Q1 can be therefore controlled in saturation state or cutoff state.

Figure 5:
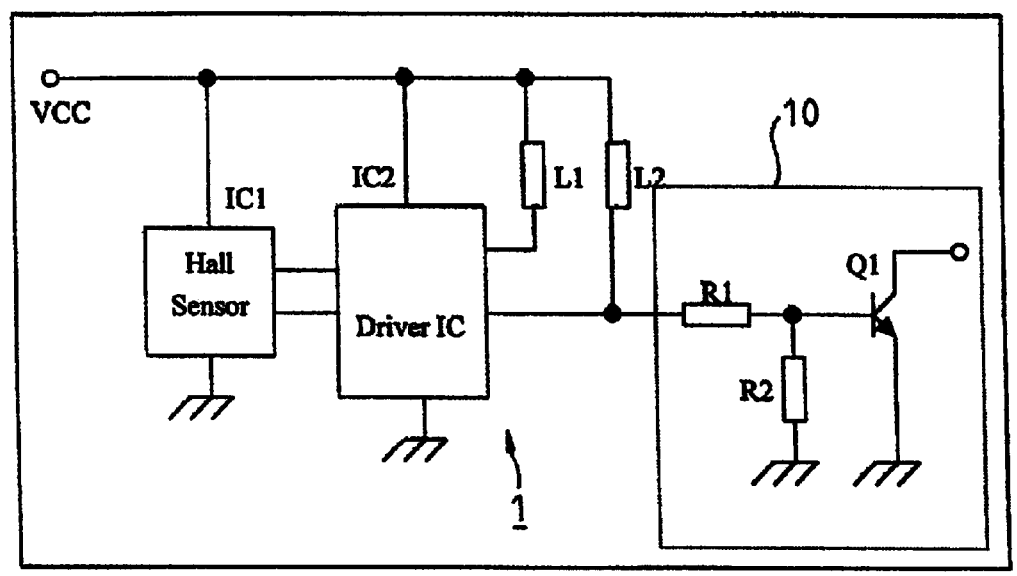
FIG. 5 is a circuit diagram of a rotation detection circuit of a dc brushless motor using a fixed bias voltage and a driver circuit of a double phase dc brushless motor in accordance with a second embodiment of the present invention.
Figure 6:
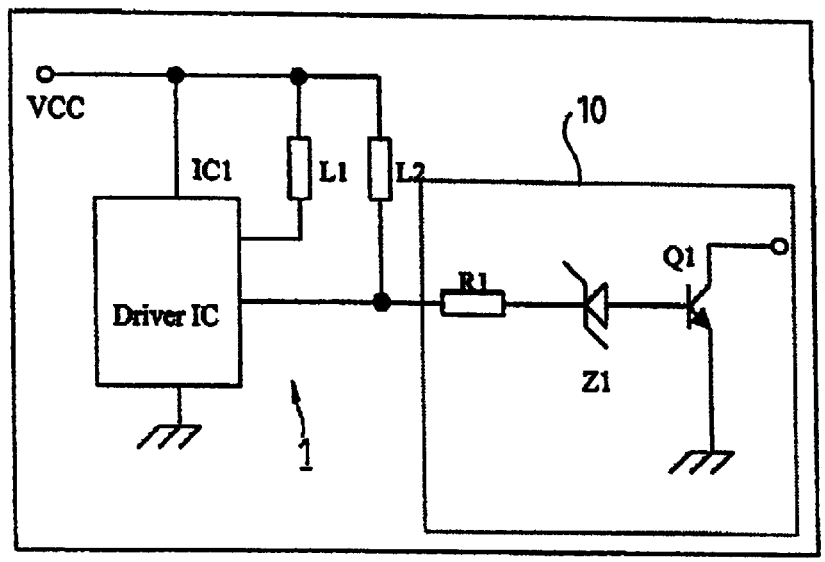
FIG. 6 is a circuit diagram of a rotation detection circuit of a dc brushless motor using a fixed bias voltage and a driver circuit of a double phase dc brushless motor in accordance with a third embodiment of the present invention.
Figure 7:
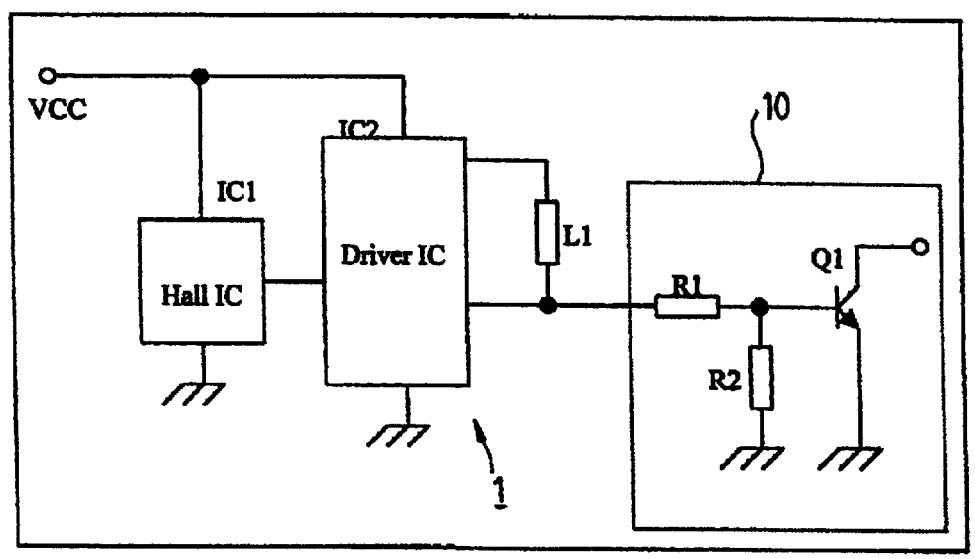
FIG. 7 is a circuit diagram of a rotation detection circuit of a dc brushless motor using a fixed bias voltage and a driver circuit of a single phase dc brushless motor in accordance with a fourth embodiment of the present invention.

FIG. 5 is a circuit diagram of a rotation detection circuit of a dc brushless motor using a fixed bias voltage and a driver circuit of a double phase dc brushless motor in accordance with a second embodiment of the present invention. FIG. 6 is a circuit diagram of a rotation detection circuit of a dc brushless motor using a fixed bias voltage and a driver circuit of a double phase dc brushless motor in accordance with a third embodiment of the present invention. FIG. 7 is a circuit diagram of a rotation detection circuit of a dc brushless motor using a fixed bias voltage and a drive circuit of a single phase dc brushless motor in accordance with a fourth embodiment of the present 17 invention.

Some of the parts in accordance with the second, third and fourth embodiments of the present invention are the same as those of the first embodiment of the present invention. The same parts of these embodiments will be referred-to by the identical reference numerals for the sake of clarity. In addition, the sane parts of the second, third and fourth embodiments have a similar configuration and the same functions as the first embodiment, and detailed descriptions thereof are omitted.

As shown in FIG. 5, a rotation detection circuit 10 of a dc brushless motor using a fixed bias voltage is applied in a driver circuit 1 of a double phase dc brushless motor in accordance with the second embodiment of the present invention. The driver circuit 1 of the double phase dc brushless motor includes a hall sensor ICI, and a driver IC2. The driver IC2 outputs a high or low level signal to the rotation detection circuit 10, and then the voltage of the high or low level signal is divided by the first resistor R1 and the second resistor R2. Alternatively, the high and low level signals are input into the base of the transistor Q1.

Referring to FIG. 6, a rotation detection circuit 10 of a dc brushless motor using a fixed bias voltage in accordance with the third embodiment of the present invention comprises a transistor Q1, and a signal adjuster. The signal adjuster is connected in series with a zener diode Z1, and further includes a first resistor R1, and a zener diode Z1, such that the rotation detection circuit 10 includes the first resistor R1, the zener diode Z1 and the transistor Q1 to form an amplifier circuit using a fixed bias voltage. The voltage of the square wave signal output from the driver ICI of the motor driver circuit 1 is adjusted by the first resistor R1 and the zener diode Z1, and then input into the base of the transistor Q1 to be amplified to produce a rotation detection signal. The transistor Q1 can be therefore controlled in saturation state or cutoff state.

Again referring to FIG. 6, the driver IC of the driver circuit 1 outputs a low level signal to the rotation detection circuit 10, which signal may be a low level vague signal greater than 0.7V. When the voltage of the low level signal is lower than the breakdown voltage (0.7V) of the zener diode Z1, the current input into the base of the transistor Q1 cannot conduct the transistor Q1 and thus the transistor Q1 cannot be conducted by the low level signal. Alternatively, the driver IC of the driver circuit 1 outputs a high level signal to the rotation detection circuit 10. When the voltage of the high level signal is greater than the breakdown voltage (0.7V) of the zener diode Z1, the signal is input into the base of the transistor Q1, such that the transistor Q1 of the rotation detection circuit 10 can be conducted by the high level signal. The transistor Q1 can be therefore controlled in saturation state or cutoff state.

As shown in FIG. 7, a rotation detection circuit 10 of a dc brushless motor using a fixed bias voltage is applied in a driver circuit 1 of a single phase dc brushless motor in accordance with the fourth embodiment of the present invention. The driver circuit 1 of the single phase dc brushless motor includes a hall sensor ICI, and a driver IC2. The driver IC2 may output the high or low level signal to the rotation speed detection circuit 10, and after the voltage of the high or low level signal is divided through the first resistor R1 and the second resistor R2, the high or low level signal may be input into the base of the transistor Q1.

Referring again referring to FIGS. 1 and 4–7, the conventional rotation detection circuit 10 of a dc brushless motor includes a transistor Q1 and a resistor R1 to form an amplifier circuit. On the contrary, the rotation detection circuit 10 of a dc brushless motor using a fixed bias voltage in accordance with the present invention comprises a transistor Q1, and a signal adjuster. The signal adjuster can be selectively applied using a fixed bias voltage or connected in series with a zener diode. Accordingly, the transistor Q1 can avoid operating in a vague state between the saturation state and the cutoff state, and can thus be absolutely controlled in saturation state or cutoff state. The rotation detection circuit 10 of a dc brushless motor using a fixed bias voltage in accordance with the present invention may enhance the quality of the detected signal and the design tolerance of the rotation detection circuit.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A rotation detection circuit of a dc brushless motor using a fixed bias voltage applied to a driver circuit, the rotation detection circuit comprising:
    a transistor adapted to amplify an output signal of the driver circuit for outputting a rotation detection signal; and
    a signal adjuster connected in series between the transistor and the driver circuit for adjusting a voltage of a signal output from the driver circuit to the transistor, said signal adjuster including at least one series-connected first resistor and said rotation detection circuit including at least one of the following:
        a second resistor connected to the first resistor to form a voltage divider; and
        a zener diode connected in series with the signal adjuster;
    wherein the signal output from the driver circuit to the transistor is adjusted by the signal adjuster to ensure that a low voltage output by the driver circuit cuts-off the transistor and to ensure that a high voltage output by the driver circuit turns-on the transistor, and then input into the base of the transistor to be amplified to produce the rotation detection signal.

2. The rotation detection circuit as claimed in claim 1, wherein the signal adjuster includes the first resistor and the second resistor and the rotation detection circuit includes the first resistor, the second resistor and the transistor to form an amplifier circuit with a fixed bias voltage.

3. The rotation detection circuit as claimed in claim 1, wherein the signal adjuster includes the first resistor and the zener diode connected in series with the driver circuit and the transistor so that the rotation detection circuit includes the first resistor, the zener diode and the transistor to form an amplifier circuit with a fixed bias voltage.

4. The rotation detection circuit as claimed in claim 1, wherein the rotation detection circuit is applied in the driver circuit of a double phase dc brushless motor.

5. The rotation detection circuit as claimed in claim 1, wherein the rotation detection circuit is applied in the driver circuit of a single phase brushless motor.

\* \* \* \* \*